United States Patent [19]
Kielma et al.

[11] 4,125,932
[45] Nov. 21, 1978

[54] MULTIPLE SPINDLE MACHINE TOOL

[75] Inventors: Ervin J. Kielma, West Allis; Albin J. Schabowski, Milwaukee, both of Wis.

[73] Assignee: Kearney & Trecker Corporation, West Allis, Wis.

[21] Appl. No.: 808,107

[22] Filed: Jun. 20, 1977

[51] Int. Cl.$^2$ ............................................. B23Q 3/157
[52] U.S. Cl. .................................... 29/568; 214/1 BD
[58] Field of Search ............ 29/568, 26 A; 214/1 BC, 214/1 BD; 408/35

[56] References Cited

U.S. PATENT DOCUMENTS

| | | | |
|---|---|---|---|
| 3,762,036 | 10/1973 | Goebel et al. | 29/568 |
| 3,797,363 | 3/1974 | Nohejl | 408/35 |
| 3,964,616 | 6/1976 | Piotrowski | 214/1 BD |
| 4,038,739 | 8/1977 | Nohejl | 29/568 |

*Primary Examiner*—Gil Weidenfeld
*Attorney, Agent, or Firm*—Cyril M. Hajewski; Donald J. Piggott

[57] ABSTRACT

A plurality of multiple spindle toolheads are stored in a carousel-type toolhead magazine on top of a machine tool which includes a toolhead driver for driving any selected one of the toolheads. The toolhead driver is mounted for movement along a Z axis toward and away from a worktable. A rotary toolhead changer arm for transferring toolheads from the toolhead magazine to the toolhead driver and vice versa is mounted on the machine for rotation about an axis which is inclined at an angle of 45° to the Z axis. The toolhead changer arm has two diametrically opposed ends which are each inclined at an angle of 45° to the rotary axis of the toolhead changer arm. Clamps are mounted on both ends of the toolhead changer arm for clamping toolheads thereto. When the toolhead changer arm is rotated through 180°, one end moves a toolhead from a position adjacent to the toolhead driver to a position adjacent to the toolhead magazine while the other end moves a toolhead from a position adjacent to the toolhead magazine to a position adjacent to the toolhead driver.

14 Claims, 18 Drawing Figures

Fig. 2

MULTIPLE SPINDLE MACHINE TOOL

BACKGROUND OF THE INVENTION

This invention relates to multiple spindle machine tools which utilize a plurality of interchangeable multiple spindle toolheads. In the past, such machines had relatively complicated toolhead transfer mechanisms for transferring toolheads from the storage magazine to the toolhead driver and a relatively long time was required to effect this transfer. Transfer of the toolheads from the toolhead driver back to the storage magazine was equally complex and time-consuming.

Accordingly, the principle object of this invention is to provide a multiple spindle toolhead transfer mechanism which is simpler and faster than those heretofore known in the art.

Other objects and advantages of the invention will be apparent from the detailed description herein.

SUMMARY OF THE INVENTION

In accordance with this invention, the foregoing objects are attained by providing a toolhead changer arm which is journalled for rotation about an axis that is inclined at an angle of 45° to the axis along which the toolhead driver is mounted for sliding movement. The toolhead changer arm has two diametrically opposed ends which are each inclined at an angle of 45° to the rotary axis of the toolhead changer arm. Clamps are mounted on both ends of the toolhead changer arm for clamping toolheads thereto.

DESCRIPTION OF THE PREFERRED EMBODIMENTS

Figure 1:
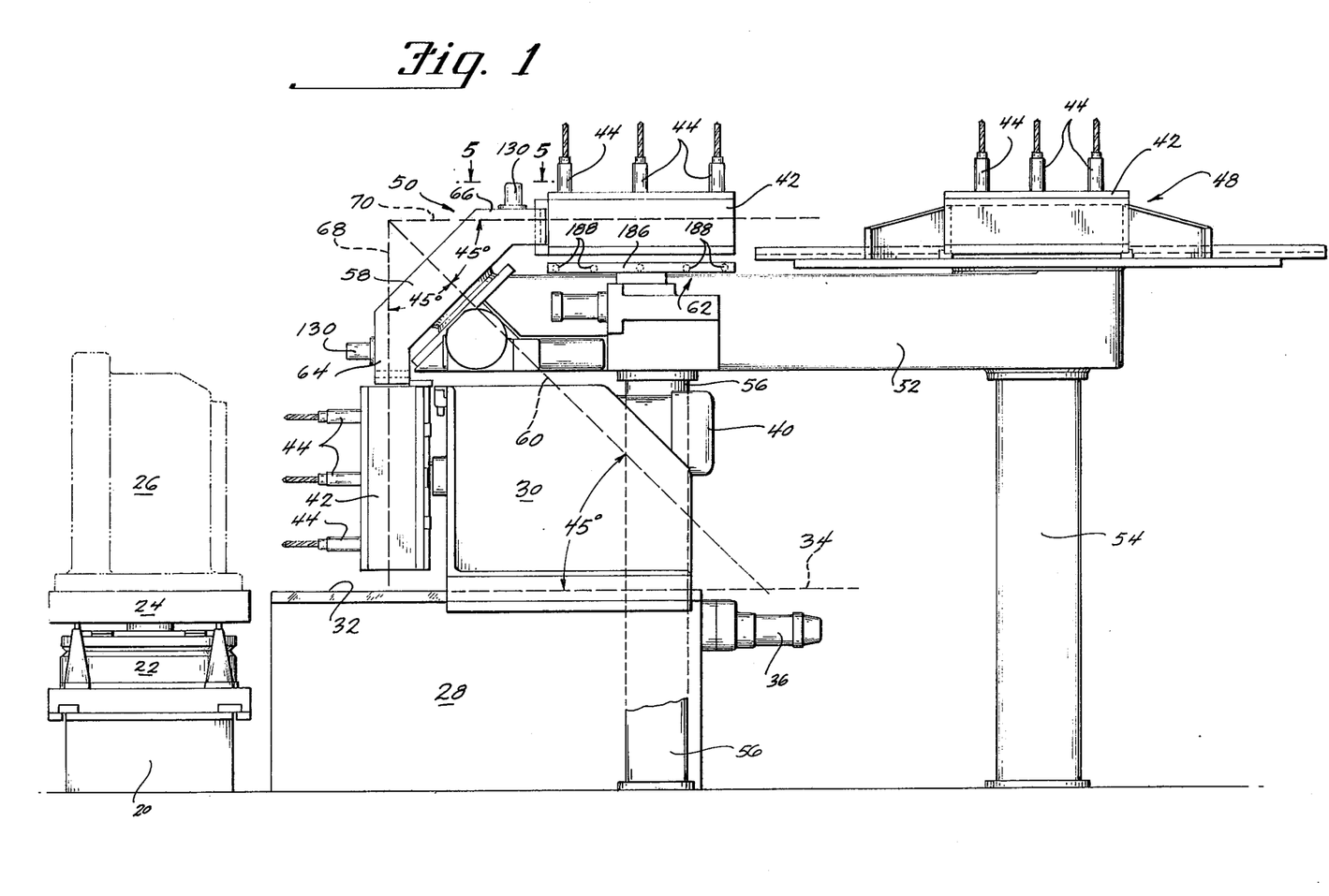
FIG. 1 is a side elevation view of one preferred embodiment of the invention.

Referring to FIG. 1, one preferred embodiment of the invention includes a first bed portion 20 upon which a worktable 22 is slidably mounted for movement along a horizontal X axis and is rotatably mounted for rotation about a vertical B axis perpendicular to the X axis. A pallet 24 carrying a workpiece 26 is shown mounted on worktable 22.

A second bed portion 28 has a toolhead driver 30 slidably mounted thereon on ways 32 for movement along a Z axis 34 toward and away from worktable 22. Toolhead driver 30 is selectively driven along ways 32 by a Z axis motor 36 along with the conventional mechanical coupling means (not shown) and the conventional electrical control means (not shown). Toolhead driver 30 contains a drive shaft 38 (FIG. 12) which is rotated by a spindle drive motor 40 (FIG. 1) along with the conventional mechanical coupling means (not shown) and the conventional electrical control means (not shown). Toolhead driver 30 also contains clamp means for locating and clamping multiple spindle toolhead 42 thereto as described in later paragraphs.

Each multiple spindle toolhead 42 has a plurality of spindles 44 which are each equipped to receive a drill or a tap and are all simultaneously rotated by a common drive shaft 46 (FIG. 12) which mates with toolhead drive shaft 38 and is driven thereby. In the operation of this embodiment, multiple spindle toolheads 42 are clamped to toolhead driver 30 and are then moved against workpiece 26 to simultaneously drill or tap a predetermined pattern of holes therein.

In this embodiment of the invention, a toolhead storage magazine 48 (FIG. 1) and toolhead transfer mechanism 50 are mounted on an elevated frame 52 which is supported above toolhead driver 30 by a single rear post 54 and a pair of front posts 56 (FIG. 2) which are arranged in a triangular pattern with front posts 56 flanking toolhead driver 30. Toolhead transfer mechanism 50 includes a toolhead changer arm 58, which is journalled to frame 52 for rotation about an axis 60, and a toolhead shifter 62, which shifts toolhead 42 from toolhead magazine 48 to the adjacent end of toolhead changer arm 58. The rotary axis 60 of toolhead changer arm 58 is inclined at an angle of 45° to Z axis 34. The diametrically opposed ends 64 and 66 of toolhead changer arm 58 are each inclined at an angle of 45° to the rotary axis 60 thereof as indicated by the corresponding longitudinal toolhead axes 68 and 70. This particular disposition of the axes 60, 68 and 70 permit toolhead changer arm 58 to swing toolheads 42 from a horizontal to a vertical position and vice versa. As toolhead changer arm 58 swings through an 180° arc to interchange the toolheads 42, the toolheads 42 travel in a conical path which has an apex angle of 90°

Figures 3, 4:
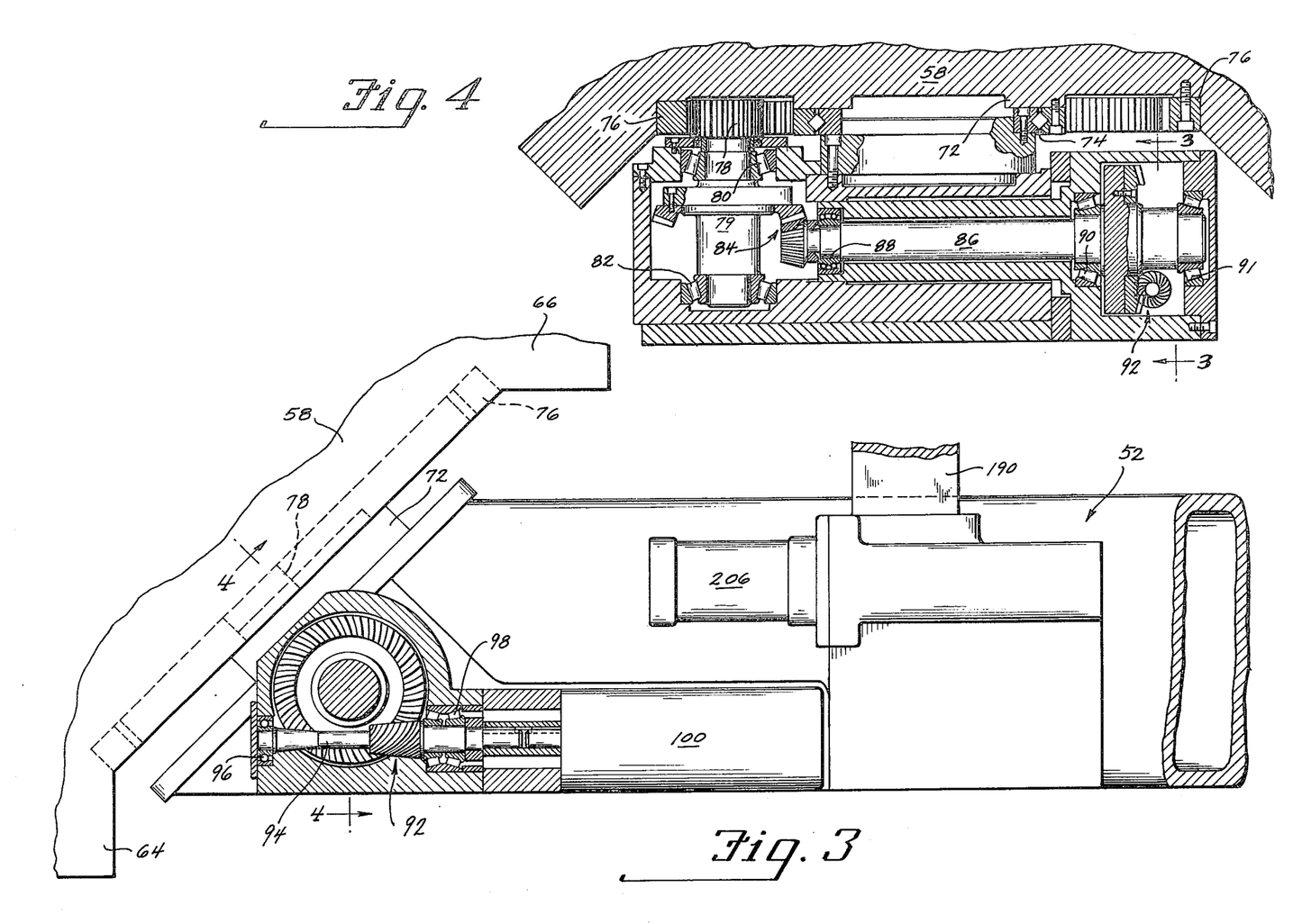
FIG. 3 is an enlarged fragmentary side elevation view of the drive mechanism for the toolhead changer arm shown in FIG. 1.
FIG. 4 is an enlarged fragmentary cross-sectional view taken on the line 4—4 of FIG. 3.
Figure 5:
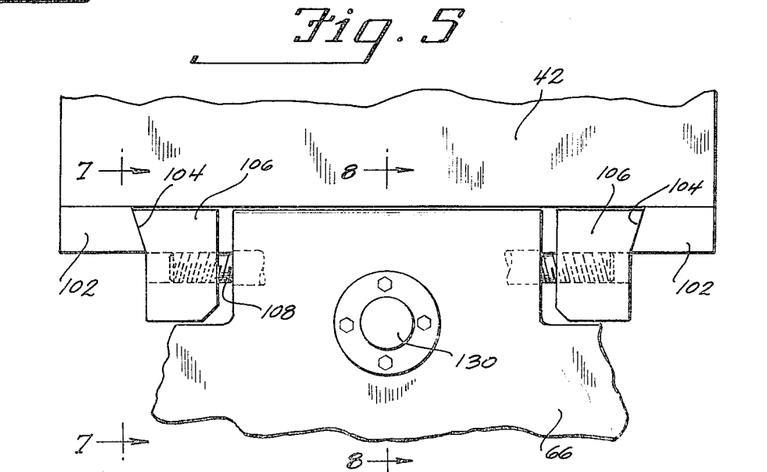
FIG. 5 is an enlarged fragmentary end view of one end of the toolhead changer arms taken on the line 5—5 of FIG. 1.
Figure 6:
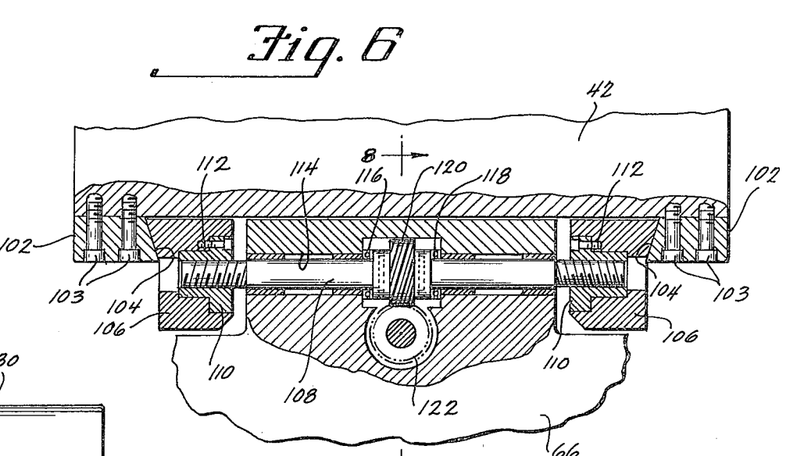
FIG. 6 is an end view similar to FIG. 5 but with exterior portions cut away to reveal inner details.
Figure 7:
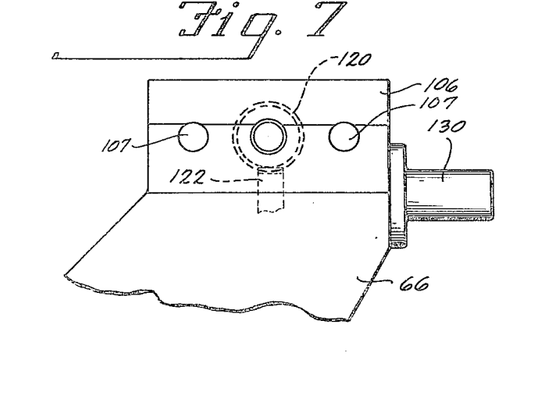
FIG. 7 is a fragmentary side view taken on the line 7—7 of FIG. 5.

The mechanism which rotates toolhead changer arm 58 is shown in FIGS. 3 and 4. Toolhead changer arm 58 has a central circular hub 72 which is journalled to frame 52 by bearings 74. A ring gear 76 is rigidly attached to arm 58 around hub 72 and is driven by a pinion 78 on shaft 79 which is journalled to frame 52 by bearings 80 and 82. Shaft 79 is driven by a bevel gear set 84 whose pinion is attached to a shaft 86 which is journalled to frame 52 by bearings 88, 90 and 91. Shaft 86 is driven by a spiroid gear set 92 whose worm is attached to a shaft 94 which is journalled by bearings 96 and 98 to frame 52 and is driven by an electric motor 100 mounted on frame 52.

Figure 2:
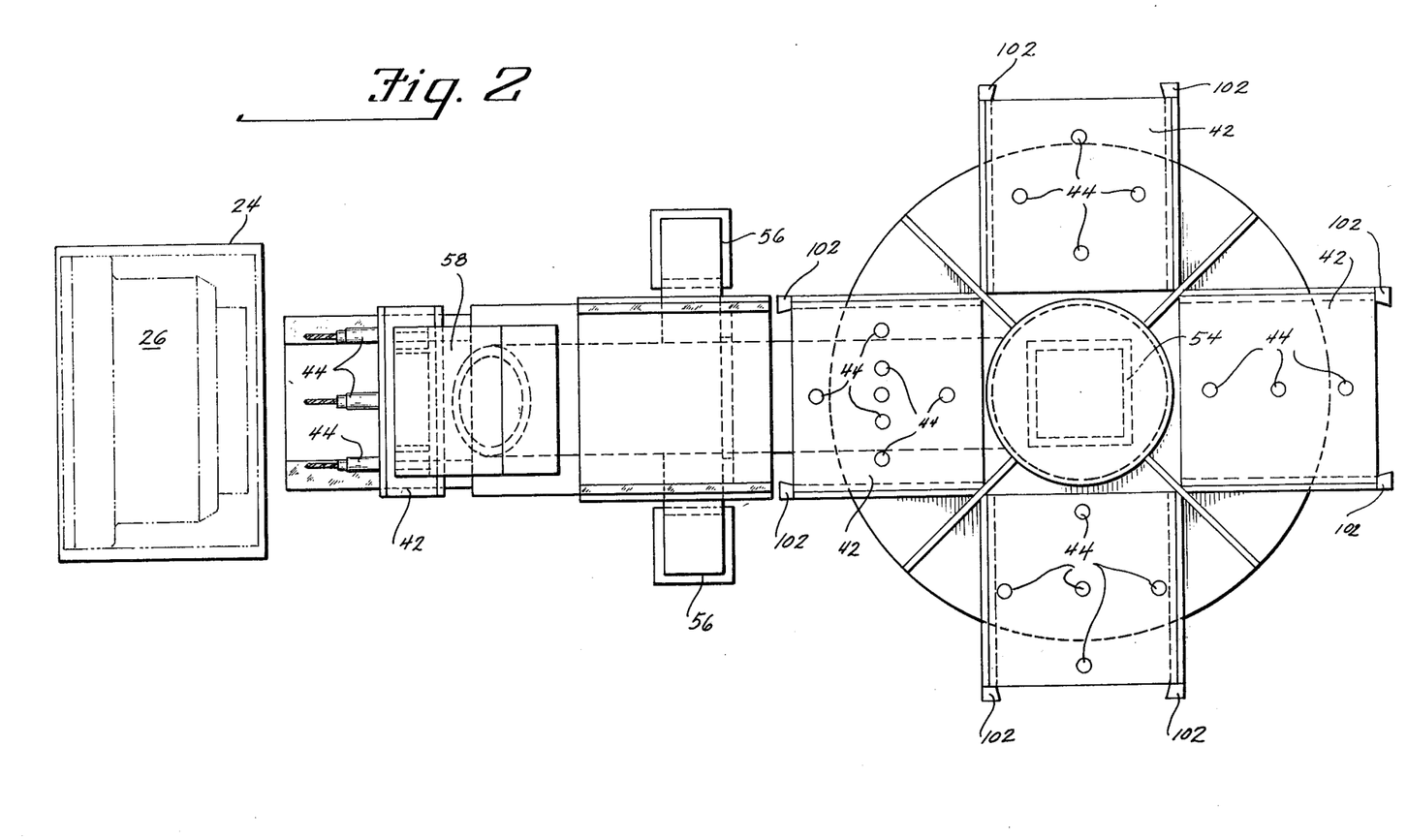
FIG. 2 is a plan view of the embodiment shown in FIG. 1.

Motor 100 is energized by conventional control circuitry (not shown) to drive the above-described gear train to cause toolhead changer arm 58 to rotate through a 180° arc and then to stop at the location shown in FIGS. 1 and 2 with the toolhead 42 on one end being adjacent to tool storage magazine 48 and the toolhead 42 on the other end being adjacent to toolhead driver 30. When toolhead changer arm 58 is rotated a second time through an 180° arc, the position of the two toolheads 42 is interchanged.

FIGS. 5-8 show the clamp on the ends of toolhead changer arm 58 for clamping the toolheads 42 thereto. Each of the toolheads 42 have a pair of tapered rails 102 (FIGS. 5 & 6) attached thereto by bolts 103. Each of the rails 102 has an inwardly tapered surface 104 against which a pair of opposed clamp blocks 106 are wedged. Clamp blocks 106 are slidably mounted on two guide rods 107 which serve to carry the weight of toolhead 42. Clamp blocks 106 are connected to opposite ends of a threaded shaft 108 by threaded sockets 110 which are attached to blocks 106 by bolts 112. One end of shaft 108 is threaded in the right hand direction while the other is threaded in the left hand direction so that blocks 106 will be spread apart when shaft 108 is rotated in one direction and will be drawn together when shaft 108 is rotated in the opposite direction.

Shaft 108 is journalled within a bore 114 in the end 66 of tool changer arm 58 by bearings 116 and 118 and has a worm gear 120 rigidly attached to its inner portion. Worm gear 120 meshes with another worm gear 112 (FIG. 8) on shaft 124 which is journalled to arm end 66 through bearings 126 and 128. Shaft 124 extends at right angles to shaft 108 and is driven by a hydraulic motor 130.

Figure 8:
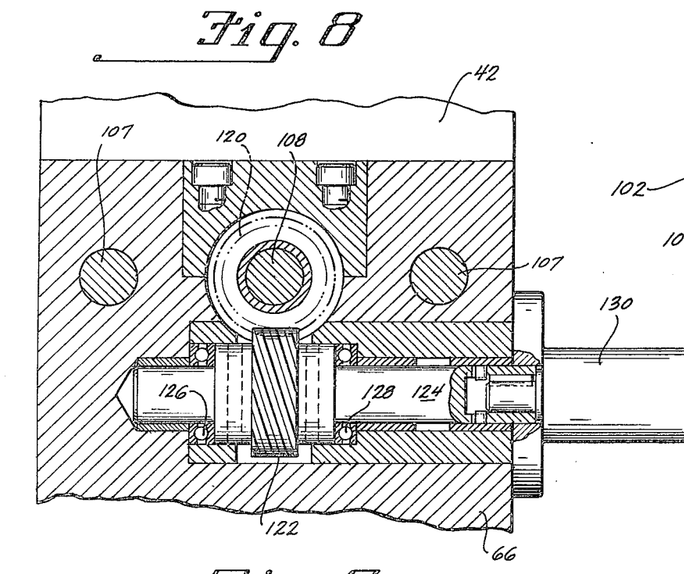
FIG. 8 is a longitudinal sectional view taken on the line 8—8 of FIGS. 5 and 6.
Figure 9:
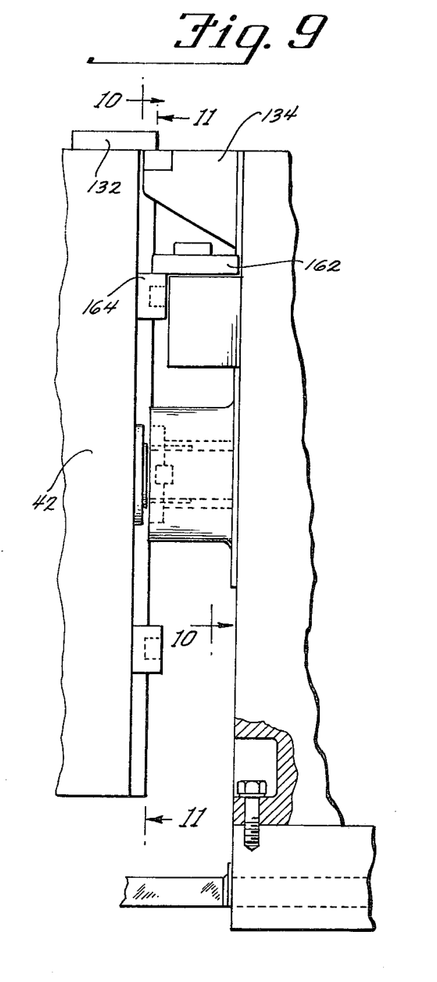
FIG. 9 is an enlarged fragmentary side elevation view of the toolhead driver and the toolhead clamped thereto.

Motor 130 is controlled by a conventional electro-hydraulic motor control circuit (not shown) to turn in one direction when it is desired to clamp a toolhead 42 to tool changer arm end 66 and to turn in the other direction when it is desired to unclamp the toolhead 42. Clamping is effected by pressing clamp blocks 106 outwardly against rails 102 and unclamping is effected by moving clamp blocks 106 inwardly away from rails 102 far enough to clear rails 102.

An identical clamping structure is mounted on the other end 64 of the toolhead changer arm 58 for clamping a toolhead 42 thereto.

Figure 13:
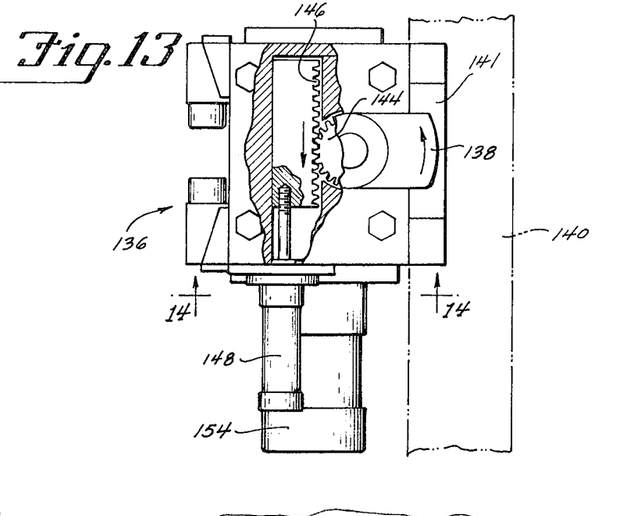
FIG. 13 is an enlarged fragmentary end view, partially cut away, of one toolhead clamp on the toolhead driver.

FIGS. 9-15 show the locating and clamping of toolhead 42 to toolhead driver 30. Toolhead 42 is supported on toolhead driver 30 by a pair of lugs 132 (FIGS. 9 & 10) on the end of toolhead 42 which rest on a pair of matching brackets 134 that project from the front of toolhead driver 30. Toolhead 42 is clamped to toolhead driver 30 by the combination of four clamp assemblies 136 (FIG. 10) on the toolhead driver 30 which rotate lugs 138 into recesses 139 (FIG. 11 & 14) behind rails 140 on toolhead 42 annd then press lugs 138 against rails 140. Rails 140 are clamped against blocks 141 that are fastened to clamp assembly 136. Each of the lugs 138 projects at right angles from a rotatable sleeve 142 (FIG. 14) which has a pinion gear 144 thereon which meshes with a rack 146 (FIG. 13). Rack 146 is slidably mounted in clamp assembly 136 and is moved back and forth by a hydraulic cylinder 148 to cause lug 138 to rotate through a 90° arc to engage and disengage rail 140.

Figures 11, 15:
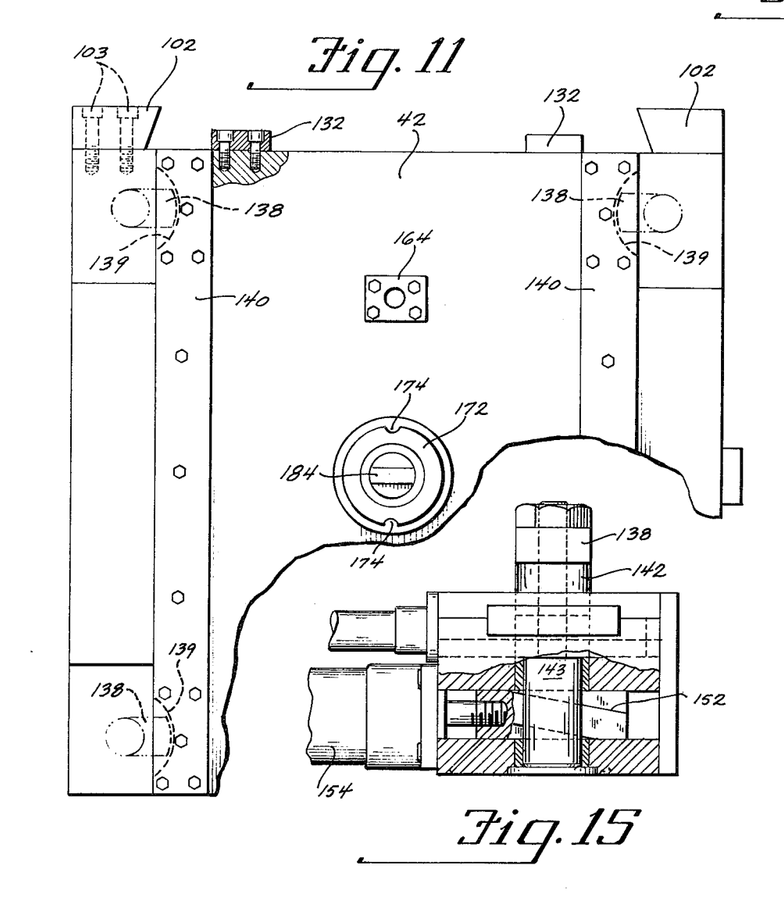
FIG. 11 is a fragmentary end view of the toolhead taken on the line 11—11 of FIG. 9.
FIG. 15 is an enlarged fragmentary side view taken on the line 15—15 of FIG. 14.
Figure 14:
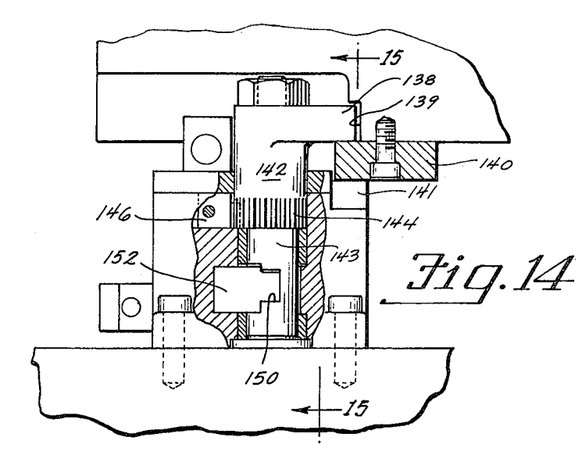
FIG. 14 is an enlarged fragmentary plan view taken on the line 14—14 of FIG. 13.

After lug 138 is engaged with rail 140 a second portion of the clamp structure is actuated to press lug 138 against rail 140. This second portion of the clamp structure is illustrated in FIGS. 14 and 15. Sleeve 142 rotates 90° on camshaft 143 which has a cam slot 150 therein (FIG. 14) which is shaped to interact with a wedge 152 which is slidably mounted in clamp assembly 136 and is moved back and forth by a hydraulic cylinder 154. When wedge 152 is moved in one direction by cylinder 154, it wedges lug 138 against rail 140. When wedge 152 is moved in the other direction, it releases the pressure on lug 138 and frees it to be disengaged from rail 140.

Each of the clamping assemblies 136 is identical to the abovedescribed clamping assembly 136 and are actuated simultaneously by conventional hydraulic cylinder control circuits (not shown) to simultaneously clamp or unclamp all four corners of toolhead 42.

Two additional clamping assemblies 156 and 158 (FIG. 10) are mounted on the front of toolhead driver 30. Clamping assembly 156 has a hydraulic cylinder 160 and a clamp member 162 which is moved thereby and which interacts with a matching clamp member 164 (FIGS. 9 & 11) on toolhead 42. Clamping assembly 158 has a hydraulic cylinder 166 and a clamp member 168 which is moved thereby and which interacts with rail 140.

Figures 10, 12:
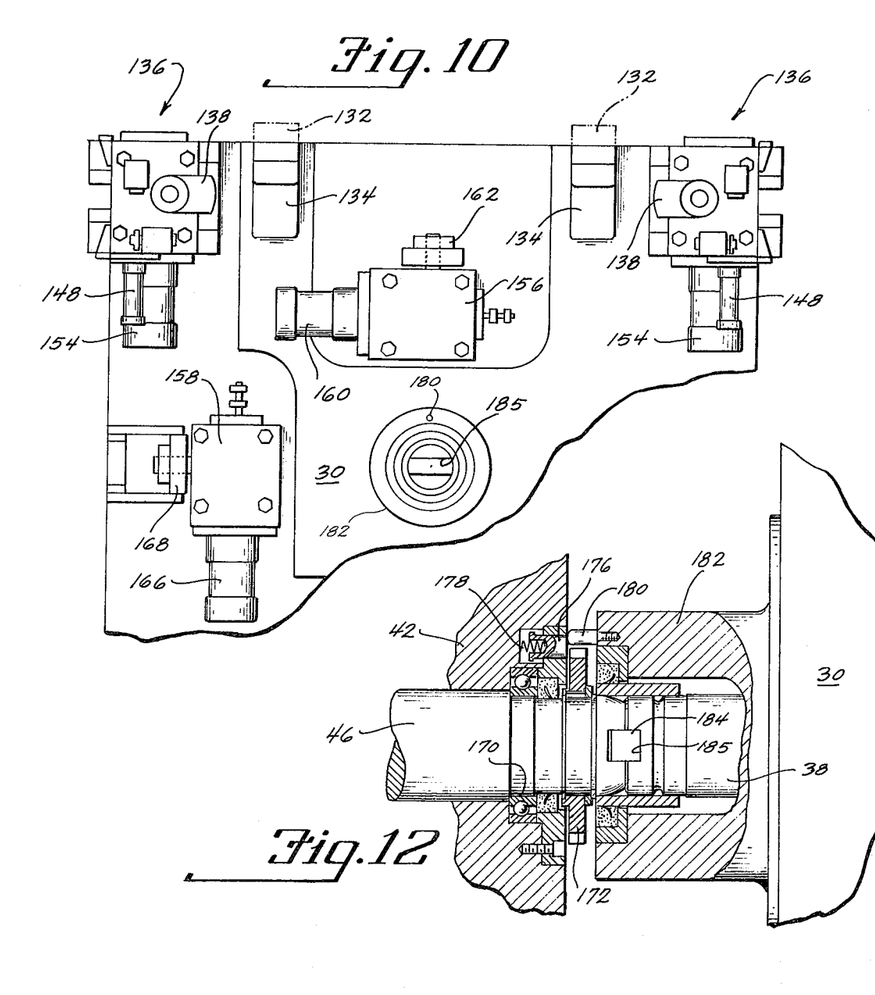
FIG. 10 is a fragmentary end view of the toolhead driver taken on the line 10—10 of FIG. 9.
FIG. 12 is an enlarged fragmentary longitudinal sectional view of the drive connection between the toolhead driver and the toolhead.

FIG. 12 shows the driving connection between toolhead 42 and toolhead driver 30. Toolhead 42 has a drive shaft 46 which is journalled therewithin by bearings 170 and projects outwardly therefrom. An alignment flange 172 is rigidly attached to shaft 46 and has alignment notches 174 (FIG. 11) cut therein which engage an alignment pin 176 (FIG. 12) when toolhead 42 is detached from toolhead driver 30. Shaft 46 always stops with a notch 174 aligned with pin 176. Alignment pin 176 is spring loaded outwardly by a spring 178 and is pressed inwardly to release shaft 46 for rotation by a release pin 180 on hub 182 which surrounds drive shaft 38 on toolhead driver 30. Drive shaft 38 makes driving connection with drive shaft 46 via a key 184 on shaft 38 which engages a slot 185 in shaft 46 when toolhead driver 30 is moved by the Z axis drive into contact with toolhead 42. This movement also causes release pin 180 to depress alignment pin 176 and thus to release shaft 46 for rotation. When toolhead driver 30 is moved by the Z axis drive away from toolhead 42, alignment pin 176 moves back into contact with alignment notch 174 and thus locks drive shaft 46 in position.

Figure 16:
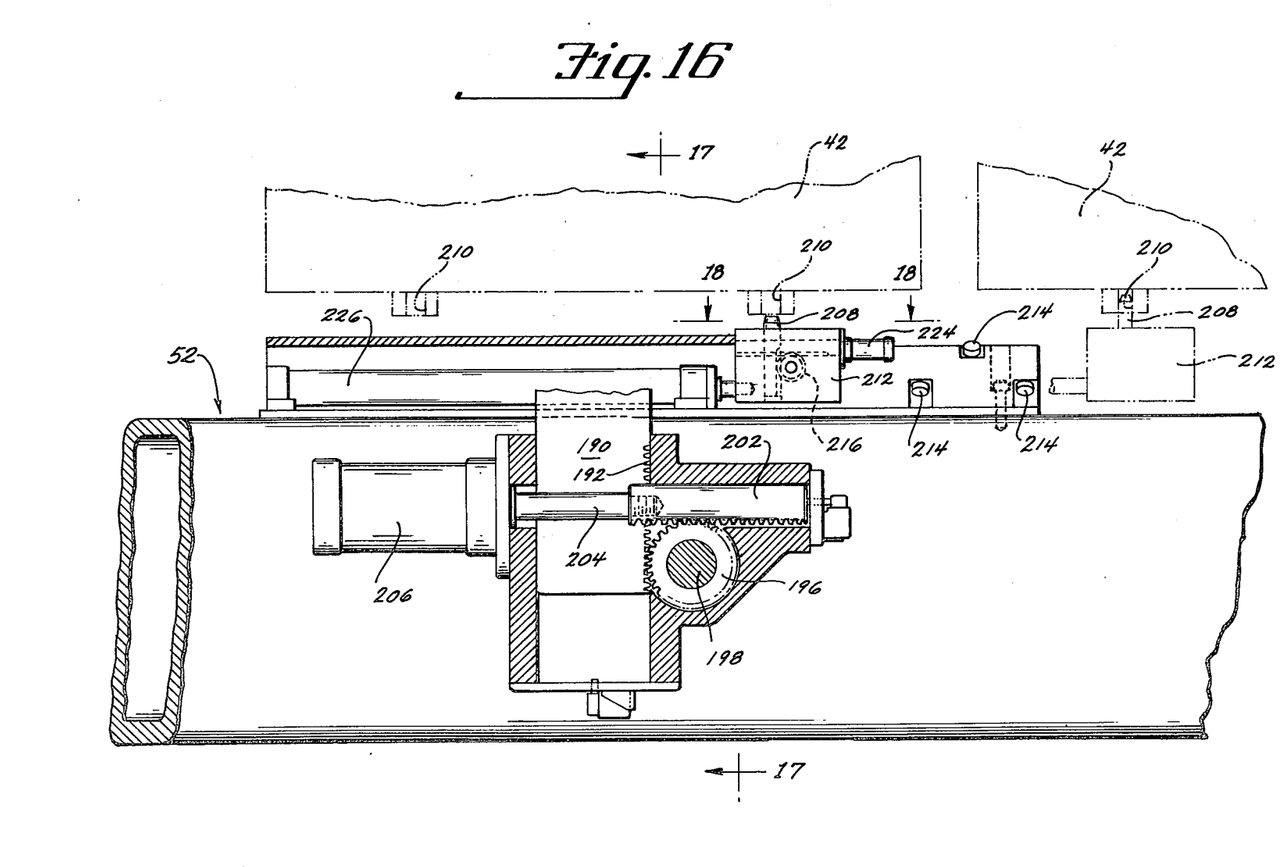
FIG. 16 is an enlarged fragmentary side elevation view of the toolhead shifter for shifting the toolheads from the toolhead storage magazine to the toolhead changer arm.
Figure 17:
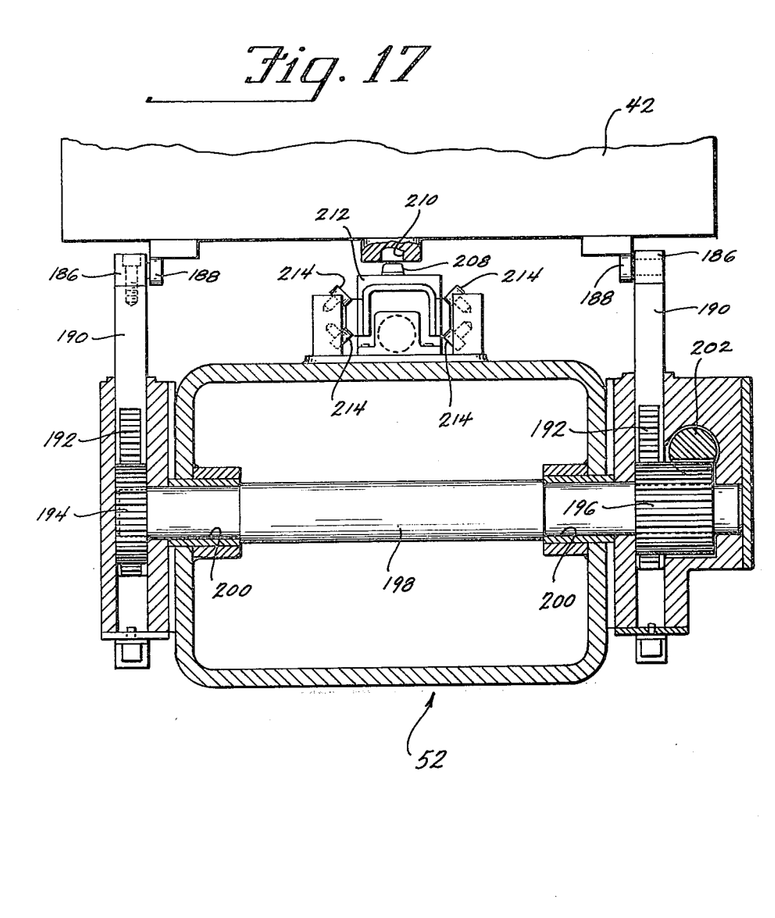
FIG. 17 is an enlarged fragmentary cross-sectional view taken on the line 17—17 of FIG. 16.
Figure 18:
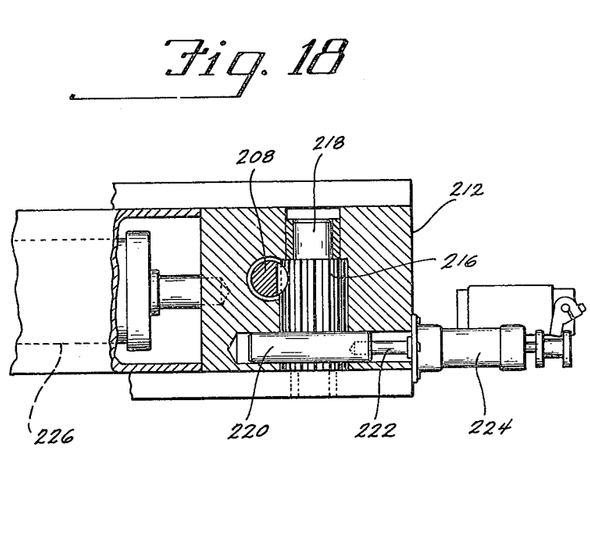
FIG. 18 is an enlarged fragmentary plan view taken on the line 18—18 of FIG. 16.

FIGS. 16, 17 and 18 show the details of toolhead shifter 62 which transfers toolheads 42 from toolhead magazine 48 to the adjacent end of toolhead changer arm 58. Referring to FIGS. 1 and 17, toolhead 42 is rollably supported on horizontal rails 186 by rollers 188. Horizontal rails 186 are supported by vertical arms 190 having rack gears 192 thereon. Vertical arms 190 are slidably mounted on frame 52 for upward and downward movement and are driven upwardly and downwardly by pinion gears 194 and 196. Pinion gears 194 and 196 are mounted on opposite ends of a shaft 198 which is journalled to frame 52 by bushings 200. Pinion gear 196 extends past rack 192 and engages a rack 202 on a shaft 204 (FIG. 16) which is slidably mounted in frame 52 and is driven by a hydraulic cylinder 206. When shaft 204 is extended by hydraulic cylinder 206, it causes arm 190 to raise, and when shaft 204 is retracted by hydraulic cylinder 206, it causes arms 190 to lower.

Toolhead 42 is shifted longitudinally along rollers 188 by a pin 208 which engages a socket 210 in the bottom of toolhead 42. Two sockets 210 are provided in the bottom of each toolhead 42 to permit two shifting movements for each toolhead 42. Pin 208 is slidably mounted in a carriage 212 which is rollably mounted on frame 52 by rollers 214. Pin 208 has a rack gear formed therein which engages a pinion gear 216 (FIG. 18) on a shaft 218 journalled to carriage 212. Pinion gear 216 engages a second rack gear 220 on a shaft 222 which is extended and retracted by a hydraulic cylinder 224 to raise and lower pin 208. The entire carriage 212 is moved horizontally by a relatively large hydraulic cylinder 226 which is coupled thereto.

To shift toolhead 42 from the end of toolhead changer arm 58 to toolhead magazine 48, cylinder 226 is first actuated to place pin 208 under the socket 210 nearest toolhead magazine 48. Cylinder 224 is then actuated to raise pin 208 into socket 210. Cylinder 226 is then extended to move carriage 212 toward toolhead magazine 28. The first stroke of cylinder 226 moves toolhead 42 halfway to toolhead magazine 48. Pin 208 is then detached from socket 210 and cylinder 226 is retracted until pin 208 is under socket 210 furthest from toolhead magazine 48. Pin 208 is inserted into socket 210. Cylinder 226 is then extended a second time to move toolhead 42 the rest of the way into the toolhead magazine 48. Pin 208 is then disengaged from socket 210 and cylinder 226 is retracted.

The foregoing process is reversed to shift a toolhead 42 from toolhead magazine 48 to the end of toolhead changer arm 58. The elevator mechanism described previously is used to lower horizontal rails 186 clear of toolhead 42 just previous to a toolhead interchange.

Toolhead magazine 48 contains suitable rollers (not shown) for slidably receiving toolheads 42 along with conventional indexing means for selectively presenting any desired compartment thereof to the loading and unloading position adjacent to toolhead shifter 62.

Although the illustrative embodiments of the invention have been described in considerable detail for the purpose of fully disclosing a practical operative structure incorporating the invention, it is to be understood that the particular apparatus shown and described is intended to be illustrative only and that the various novel features of the invention may be incorporated in other structural forms without departing from the spirit and scope of the invention as defined in the subjoined claims.

The principles of this invention now having been fully explained in connection with the foregoing, we hereby claim as our invention:

1. A multiple spindle machine tool comprising:
   a plurality of multiple spindle toolheads;
   a toolhead magazine for storing said toolheads;
   a worktable;
   a toolhead driver having means for receiving and driving any selected one of said toolheads, means supporting said toolhead driver for movement along a first axis toward and away from said worktable; and
   a rotary toolhead changer arm, toolhead shifter means positioned between said toolhead magazine and said toolhead changer arm for shifting said toolheads from said toolhead magazine to said toolhead changer arm and vice versa, said toolhead changer arm having means for transferring toolheads from said toolhead shifter means to said toolhead driver and vice versa, said toolhead changer arm being journalled to a frame for rotation about a second axis which is inclined at an angle of 45° to said first axis.

2. The machine tool according to claim 1 wherein said toolhead changer arm has two diametrically opposed ends which are each inclined at an angle of 45° to the rotary axis of said toolhead changer arm.

3. The machine tool according to claim 1 and also comprising:
   a ring gear on said toolhead changer arm;
   a pinion gear journalled to said frame and engaging said ring gear;
   a bevel gear set coupled to said pinion gear;
   a spiroid gear set coupled to said bevel gear set; and
   a motor coupled to said spiroid gear set to cause rotation of said toolhead changer arm about its rotary axis.

4. The machine tool according to claim 1 and also comprising:
   clamp means on both ends of said toolhead changer arm for clamping a toolhead thereto.

5. The machine tool according to claim 4 wherein each of said clamp means comprises:
   a shaft journalled to an end of said toolhead changer arm, there being right hand threads on one end of said shaft and left hand threads on the other end thereof;
   a first clamp member having a threaded socket which is engaged with one threaded end of said shaft;
   a second clamp member having a threaded socket which is engaged with the other threaded end of said shaft; and
   means for rotating said shaft to spread said clamp members apart or draw them together.

6. The machine tool according to claim 5 wherein said means for rotating said shaft comprises:
   a first worm gear on said shaft;
   a second worm gear journalled to said end of said toolhead changer arm and engaging said first worm gear; and
   a motor coupled to said second worm gear for rotating it in either direction.

7. The machine tool according to claim 1 and also including clamp means for clamping said toolhead to said toolhead driver.

8. The machine tool according to claim 7 wherein said clamp means comprises four clamping assemblies each located on a corresponding corner of said toolhead driver, each of said clamping assemblies comprising:
   a lug rotatably mounted on said toolhead driver;
   a pinion gear coupled to said lug;
   a rack slidably mounted on said toolhead driver and engaging said pinion gear;
   means for sliding said rack back and forth to cause rotation of said lug;
   a shaft extending transversely from said lug;
   a cam slot in said shaft;
   a wedge slidably mounted on said toolhead driver and engaging said cam slot; and
   means for sliding said wedge back and forth in said cam slot.

9. The machine tool according to claim 8 wherein said means for sliding said rack back and forth is a first hydraulic cylinder and wherein said means for sliding said wedge back and forth is a second hydraulic cylinder.

10. The machine tool according to claim 1 wherein said toolhead magazine and said toolhead changer arm are mounted on a frame which is supported in an elevated position above toolhead driver.

11. The machine tool according to claim 1 wherein said toolhead shifter means comprises:
   a pair of horizontal rails mounted on said frame in position to receive a toolhead from either said toolhead magazine or said toolhead changer arm;
   means on said rail for slidably receiving said toolhead;
   means for raising and lowering said rails; and
   means for sliding said toolhead back and forth along said rails.

12. The machine tool according to claim 11 wherein said means for raising and lowering said rails comprises:
   a pair of vertical arms supporting said rails;
   a rack gear on each of said vertical arms;
   a first shaft journalled to said frame transverse to said vertical arms adjacent to said rack gears;
   a pair of pinion gears on said shaft, each pinion gear being meshed with a corresponding one of said rack gears;
   a second shaft slidably mounted on said frame adjacent to one of said pinion gears;
   a second rack gear on said second shaft, said second rack gear being meshed with the adjacent pinion gear; and
   means for moving said second shaft back and forth to raise and lower said rails.

13. The machine tool according to claim 11 wherein said means for sliding said toolhead back and forth along said rails comprises:
   a carriage slidably mounted between said rails for movement along an axis parallel to said rails;
   means on said carriage for selectively engaging said toolhead; and
   means for moving said carriage back and forth along said axis.

14. The machine tool according to claim 13 wherein said means for selectively engaging said toolhead comprises:
   a vertical pin slidably mounted on said carriage for upward and downward movement along a vertical axis;
   a first rack gear on said pin;
   a pinion gear rotatably mounted on said carriage in mesh with said first rack gear;
   a shaft slidably mounted on said carriage adjacent to said pinion gear;
   a second rack gear on said shaft in mesh with said pinion gear; and
   means for moving said shaft back and forth to raise and lower said pin.

* * * * *